United States Patent Office 3,483,076
Patented Dec. 9, 1969

3,483,076
HOT SEALING COMPOSITIONS FOR TEXTILES
Raoul Resz, Herbert Bartl, and Karl-Arnold Weber, Cologne, and Manfred Boll, Burscheid, Germany, assignors to Farbenfabriken Bayer Aktiengesellschaft, Leverkusen, Germany, a corporation of Germany
No Drawing. Filed Aug. 31, 1965, Ser. No. 484,092
Claims priority, application Germany, Sept. 30, 1964,
F 44,097; July 9, 1965, F 46,564
Int. Cl. B32b 27/30; C09j 5/06
U.S. Cl. 161—256        10 Claims

ABSTRACT OF THE DISCLOSURE

A method for effecting a solvent resistant polymeric hot seal to textile sheets by applying as sealing composition a 50–100% saponified vinyl acetate/ethylene copolymer having a monomeric ratio of about 1:4–50 and the corresponding heat sealed article of manufacture.

This invention relates to a process for hot sealing textiles.

It is known that polyethylene can be used for hot sealing textile sheet structures due to its property of softening or melting at temperatures of 90 to 130° C. and combining with textile materials when cold. However, the seals made with polyethylene powders have the disadvantage that they canont withstand cleaning with solvents such as trichloroethylene or cleaning benzine owing to the fact that they swell or dissolve. In the process of cleaning, the polyethylene becomes detached from its base, especially within the range of 20 to 60° C. which is normally used in dry cleaning. The resistance of polyethylene to boiling washes containing the usual detergents is also found insufficient.

It has now been found that firmly adhering hot sealings resistant to solvents and boiling washes can be obtained by using partially or completely saponified ethylene/vinyl acetate copolymers which, before saponification, contain vinyl acetate and ethylene in a molar ratio of 1:4 to 1:50, preferably 1:6 to 1:30, and which are saponified, effecting a degree of hydrolysis of 50 to 100%, preferably 70 to 95%. The above hot sealing compositions can be used alone or blended with other thermoplastic materials such as polyethylene, polypropylene and, in some cases, with the addition of the usual plasticisers, paraffin, age-resistors, dyestuffs, pigments etc.

The preparation of ethylene/vinyl acetate copolymers which may be used as starting products for the hot sealing masses here claimed can be carried out by the usual methods at pressures of 200 to 4000 atmospheres and at temperatures of 30 to 250° C.

The average molecular weight of the polymers can vary within a wide range but it is preferred to use polymers having average molecular weights of 10,000 to 50,000 because it has been found that they are easily worked up when falling within this range. In the case of products having very high molecular weight, the rate of softening is too slow whereas products of lower molecular weight have unfavourable mechanical properties such as low adhesiveness, low tensile strength and greater brittleness.

The saponification of the ethylene/vinyl acetate copolymers can be carried out by any desired known methods but it is advantageous to carry out an ester interchange with aliphatic alcohols in an anhydrous medium in the presence of alkaline or acid catalysts. As alkaline ester interchange catalysts it is advantageous to use alkali metal alcoholates such as, for example, as sodium methylate, potassium ethylate etc., whereas suitable acid catalysts include hydrogen halides such as hydrogen chloride, sulphuric acid or organic sulphonic acids such as toluene sulphonic acid. For the purpose of achieving rapid and extensive alcoholysis of the ethylene/vinyl acetate copolymer, the preferred aliphatic alcohols are methyl or ethyl alcohols. Especially in the former, the equilibrium of the ester interchange reaction can be shifted in favour of the saponified polymer by distilling off the methyl acetate as the most volatile constituent.

The composition of the saponified ethylene/vinyl acetate copolymer is of great importance in determining whether the copolymer will be suitable as a hot sealing composition. It has been found that to obtain good resistance to solvents, it is necessary to have a certain content of vinyl alcohol. An increasing vinyl acetate content with respect to vinyl alcohol promotes the solubility of the polymer in the organic solvents customarily used as cleaning agents for textiles, for example trichloroethylene, cleaning benzine etc. On the other hand, excessively high vinyl alcohol contents in the polymer render the polymer too hydrophilic and the resistance to aqueous washing liquors is impaired. In addition, saponified ethylene/vinyl acetate copolymers having a high vinyl alcohol content have high softening or melting points, and this in turn has an unfavourable effect on the sealing rate or temperature. Best suited as hot sealing compositions are saponified ethylene/vinyl acetate copolymers which, prior to saponification, contain vinyl acetate and ethylene in a molar ratio of 1:4 to 1:50, preferably 1:6 to 1:30, which are incorporated by polymerization and are saponified to a degree of hydrolysis of 50 to 100%, preferably 70 to 95%. Such ethylene/vinyl acetate copolymers contain about 3 to 30% by weight of vinyl alcohol when their degree of hydrolysis is 100%.

The process according to the invention can be carried out with various polymers in the form of powders, threads, woven fabrics or fleeces.

If the hot sealing is carried out with a pulverulent material, the particle size of the saponified polymer is of importance.

If the particle size is too small, the polymer penetrates too readily into the textile material whereas the use of particles which are too large make it difficult to obtain a uniform coating. For this reason, pulverulent, saponified or partially saponified ethylene/vinyl acetate copolymers having an average grain size of 0.02 to 0.5 mm., preferably 0.05 to 0.3 mm. are used.

Such particle sizes are obtained by suitable grinding and sieving operations or by suitable procedures in the filling up of polymer containing solutions.

Further, the partially or completely saponified ethylene/vinyl acetate copolymers can be used in the form of threads, woven fabrics or fleeces. This mode of application enables a specially simple and economic distribution of the sealing compositions to be achieved without the use of special apparatus for distributing the sealing material. Loss in sealing material such as may occur in the use of pulverulent material when the material is applied by shaking or spraying is impossible in this case.

By inserting threads of partially or completely saponified ethylene/vinyl acetate copolymers between textile surfaces and ironing over these surfaces, welding seams, for example, can easily be made. When fabrics and fleeces of partially or completely saponified ethylene/vinyl acetate copolymers are used, they are simply placed between the flat textile structures and ironed together. Sealing is not effected over the whole surface but only at definite points which are determined by the structure of the sealing material and/or the structure of the surface material which is to be backed. After glueing, sufficient gaps remain to keep the flat structures porous and hence permeable to air.

The ironing tempeartures may be 120 to 170° C., preferably 130 to 150° C.

The threads can be manufactured by any known methods, e.g. by melt-, dry- or precipitation spinning processes such as those described, for example, in "Lehrbuch der Textilchemie," by Hermann Rath, publishers Springer, 2nd Edition pages 141 to 149. The titre of the threads or fibres may be 0.5 to 200 den, preferably 1.4 to 10 den, and the staple length 10 to 200 mm., preferably 30 to 100 mm.

The mesh number of the sealing fabric used, or the density and thickness of the fleece influences the properties of the sealed fabric, for example its permeability to air and moisture and its stiffness and handle. Densely or loosely woven fabrics or fleeces of sealing material are, therefore, used according to the purpose for which they are intended.

For the process according to the invention it is suitable not only to use the sheet-like structures described but also individual threads and/or fibres.

The said woven and knitted fabrics are manufactured by known processes from yarns or from endless filaments or filament bundles.

Fleeces made of the said fibres may be manufactured by the usual processes of the textile industry. It should be mentioned, in this connection, that the fibres described can be worked up either alone or mixed in any desired proportions with other natural or synthetic fibres. The fleeces can be strengthened by mechanical methods, e.g. by stitching or by adhesion, i.e. with the aid of binders or by welding or glueing the fleece to itself, e.g. with the aid of other thermoplasts. The formation of the fleece and the strengthening of the fibres may also be carried out in a process known by the name of "spun bonding."

(The manufacture of fleeces has been described, for example, in "Schweizerische Vereingung von Färbereifachleuten," Technical Journal for the Treatment of Textiles, year 1962, special edition 6 and 7.)

Hot sealing with pulverulent material is carried out by applying the pulverulent, partially or completely saponified ethylene/vinyl acetate copolymers of a certain average grain size to a textile surface and sintering on to the surface with the aid of a heat source at 130 to 200° C., preferably 150 to 170° C. Another woven fabric is then ironed on to the prepared surface at 120 to 170° C., preferably about 130 to 150° C.

Suitable textiles are woven fabrics, knitted fabrics, felts and fleeces of natural and synthetic fibre, preferably cotton, rayon, polyacrylonitrile-, polyamide- and polyester fibres.

The textile material sealed as described above has good resistance to boiling, washing and excellent resistance to solvents such as cleaning benzine, trichloroethylene, carbon tetrachloride etc. Firmly adhering sealings which are solvent resistant were hitherto obtainable only with high molecular compounds which were transformed into an insoluble state during the formation of the sealings by adding a cross-linking agent. A special advantage of the process of hot sealing as described is that the ethylene/vinyl acetate copolymers of the described composition having ethylene and vinyl alcohol units enable solvent resistant and boiling wash resistant sealings of textile fabrics without any addition of cross-linking agents simply by melting the polymers together.

EXAMPLES OF APPLICATION

The hot sealing agent is applied evenly in the form of a powder of average grain size of 0.1 to 0.3 mm. on to a cotton twill fabric and sintered on at about 150° C. with the aid of an infra-red radiator. Another cotton twill fabric is placed on to the fabric surface thus prepared and this other fabric is ironed on to the first surface in the course of one minute at 150° C. The compositions of a few saponified ethylene/vinyl acetate copolymers and the strengths of adhesion between the two hot sealed textile fabrics are given in the following table:

(a) in the untreated state,
(b) in the moist state after a treatment with trichloroethylene for 10 minutes at 20° C.,
(c) in the moist state after a boiling wash with a washing liquor consisting of 3 g. of grain soap and 2 g. of washing soda in 1 litre of water.

The adhesive strength between the two textile fabrics is determined by cutting strips of 2.5 cm. in width from the sealed piece of fabric and tearing the two fabrics apart with the application of a measured force. The force applied is given in kg./2.5 cm.

|  | Polyethylene | Product Number | | | | | | |
|---|---|---|---|---|---|---|---|---|
|  |  | 1 | 2 | 3 | 4 | 5 | 6 | 7 |
| Composition of the saponified copolymer, percent: | | | | | | | | |
| Ethylene | 100 | 81.8 | 81.6 | 77.2 | 81.6 | 79.0 | 76.3 | 70.4 |
| Vinyl alcohol | | 9.6 | 10.4 | 10.1 | 16.9 | 18.2 | 20.4 | 28.8 |
| Vinyl acetate | | 8.6 | 8.4 | 12.7 | 1.5 | 2.8 | 3.3 | 0.8 |
| Melt index of the unsaponified product [1] (g./10 min.) | 55 | 153 | 153 | 20 | 95 | 95 | 25 | 5 |
| Adhesive strength (in kg./2.5 cm.): | | | | | | | | |
| (a) Untreated | 4.0 | 4.6 | 5.4 | 6.2 | 7.0 | 6.7 | 6.0 | 3.5 |
| (b) Untreated with trichloroethylene | 1.5 | 3.7 | 3.7 | 2.1 | 4.2 | 4.7 | 4.6 | 2.7 |
| (c) Treated with washing liquor | 1.5 | 4.3 | 4.2 | 3.1 | 4.8 | 4.1 | 5.0 | 0.2 |

[1] Determined by the method of ASTM D 1238-52 T—condition E.

The table shows that all the products which contain vinyl alcohol have better resistance to solvents than polyehylene. To achieve sufficient resistance to washing for practical requirements, products having a vinyl alcohol content of up to about 25% may be used. The advantage of the products containing vinyl alcohol compared with polyethylene is clear also in this case.

Example 8

A piece of woven fabric made of saponified ethylene/vinyl acetate copolymer containing 83% ethylene, 11.6% vinyl alcohol and 5.4% vinyl acetate units and having a mesh density of about 900 mesh per sq. cm. is placed flat, without creases, between two pieces of cotton twill and ironed for one minute at 150° C.

The sealing material effects good adhesion between the cotton fabrics, this adhesion being maintained after 10 minutes continuous treatment with trichloroethylene at 20° C. and after a boiling washing with a washing liquor consisting of 3 g. of grain soap and 2 g. of washing soda in 1 litre of water.

Example 9

A fleece obtained from a saponified ethylene/vinyl acetate copolymer of the above mentioned composition and containing this copolymer in the form of fibres of 3.75 den/50 mm. is inserted between two cotton twill fabrics. The fabrics are sealed by ironing for one minute at 150°.

The seal has excellent adhesive strength which is maintained even after treatment with trichloroethylene and after a boiling wash.

Example 10

A fleece consisting of 50% of a saponified ethylene/vinyl acetate copolymer of the above composition in the form of fibres of 3.75 den/50 mm. is inserted between two cotton twill fabrics. The remaining 50% of the fibres consist of sea island cotton. The fabrics are sealed together by ironing at 150° C. for one minute.

The seal has excellent adhesive strength which is maintained even after treatment with trichloroethylene and after a boiling wash. The sealed fabrics have retained their original draping softness almost completely.

We claim:

1. A process for hot sealing textile laminates comprising applying to a textile sheet a sealing composition consisting essentially of a saponified ethylene/vinyl acetate copolymer obtained from vinyl acetate and ethylene in a mole ratio of about 1:4–50 and thereafter saponified to a degree of hydrolysis of about 50–100%; superimposing another sheet thereon and subjecting the resulting laminar structure to heat and pressure to effect a seal.

2. A process according to claim 1 wherein the sealing composition contains at least one additional component selected from the group consisting of polyethylene, polypropylene, paraffin, age resistor, dyestuff and pigment.

3. A process according to claim 1 wherein the sealing composition is used in the form of powders, threads, woven fabrics or fleeces.

4. The process of claim 1 wherein the ratio of vinyl acetate to ethylene in the unsaponified copolymer is 1:6–30.

5. A process according to claim 1, wherein the sealing composition is a pulverulent polymer having an average grain size of about 0.02–0.5 mm.

6. A process according to claim 1, wherein the sealing composition is used in the form of threads or fibres having a titre of about 0.5–200 den.

7. A process according to claim 1, wherein the sealing composition is used in the form of threads or as fibres having a staple length of about 10–200 mm.

8. A process according to claim 1, wherein the sealing composition prior to saponification contains vinyl acetate and ethylene in a molar ratio of 1:4.

9. A process according to claim 1, wherein the sealing composition utilizes an active material saponified to a degree of hydrolysis of 70 to 95%.

10. An article of manufacture consisting essentially of a textile component, a sealing composition as defined in claim 1 sintered thereon, and a superimposed textile attached to said textile component and said sintered sealing composition by application of heat and pressure.

References Cited

UNITED STATES PATENTS

| | | | |
|---|---|---|---|
| 2,312,925 | 3/1943 | McBurney et al. | 161—249 XR |
| 2,386,347 | 10/1945 | Roland | 260—86 |
| 2,399,653 | 5/1946 | Roland | 260—86 |
| 2,341,398 | 2/1944 | Strother et al. | 260—87 |
| 2,403,464 | 7/1946 | Smith | 8—115.5 |
| 2,403,465 | 7/1946 | Pease | 260—42 |
| 2,532,983 | 12/1950 | Alderson | 161—251 XR |
| 2,877,196 | 3/1959 | Reding | 260—28.5 |
| 3,012,911 | 12/1961 | Moser | 117—140 |

HAROLD ANSHER, Primary Examiner

D. J. FRITSCH, Assistant Examiner

U.S. Cl. X.R.

156—309, 332, 334